US009522659B2

(12) United States Patent
Matsushita (10) Patent No.: US 9,522,659 B2
(45) Date of Patent: Dec. 20, 2016

(54) BRAKE SYSTEM

(75) Inventor: Satoshi Matsushita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 2731 days.

(21) Appl. No.: 12/006,833

(22) Filed: Jan. 4, 2008

(65) Prior Publication Data

US 2008/0179941 A1 Jul. 31, 2008

(30) Foreign Application Priority Data

Jan. 30, 2007 (JP) .................................. 2007-19753

(51) Int. Cl.
| B60T 13/74 | (2006.01) |
| B60T 8/32 | (2006.01) |
| B60T 8/40 | (2006.01) |
| B60T 13/66 | (2006.01) |
| B60T 17/22 | (2006.01) |

(52) U.S. Cl.
CPC ............ B60T 8/3275 (2013.01); B60T 8/4081 (2013.01); B60T 13/662 (2013.01); B60T 13/745 (2013.01); B60T 17/221 (2013.01); B60T 2201/03 (2013.01)

(58) Field of Classification Search
CPC ..................................................... B60T 13/745
USPC ................................................ 303/20, 115.2
See application file for complete search history.

(56) References Cited

U.S. PATENT DOCUMENTS

| 4,826,255 | A | 5/1989 | Volz |
| 4,941,553 | A * | 7/1990 | Harrison ........................ 188/156 |
| 4,969,756 | A * | 11/1990 | Villec et al. ................... 388/815 |
| 6,075,332 | A | 6/2000 | McCann |
| 6,315,370 | B1 * | 11/2001 | Feigel et al. ................ 303/115.2 |
| 6,481,805 | B1 | 11/2002 | Ichinose et al. |
| 6,496,768 | B2 * | 12/2002 | Yamamoto ........................ 701/70 |
| 6,533,369 | B2 * | 3/2003 | Baumgartner et al. ........ 303/155 |
| 6,550,871 | B1 | 4/2003 | Bohm et al. |
| 6,913,327 | B2 * | 7/2005 | Thomas ........................ 303/155 |
| 7,677,352 | B2 | 3/2010 | Bohm |

FOREIGN PATENT DOCUMENTS

| CH | 343 437 | 12/1959 |
| JP | 2000-095094 A | 4/2000 |
| JP | 2001-239929 A | 9/2001 |
| JP | 2002-154426 A | 5/2002 |
| JP | 2005-343366 | 12/2005 |
| JP | 2005-343366 A | 12/2005 |
| JP | 2007-500098 A | 1/2007 |

* cited by examiner

*Primary Examiner* — Bradley King
(74) *Attorney, Agent, or Firm* — Carrier Blackman & Associates, P.C.; William D. Blackman; Fulchand P. Shende (57) ABSTRACT

A brake system includes an electric brake force generator which brakes a wheel using a driving force of an electric motor and an electric motor controller that performs a field-weakening control of the electric motor. The electric motor controller performs the field-weakening control of the electric motor which then operates the electric brake force generator. Thus, the rotational speed of the electric motor is increased when the field weakening control is performed by the electric motor controller thereby quickly activating the electric braking force generator to enhance response of brake force generation.

2 Claims, 10 Drawing Sheets

BRAKE SYSTEM

CROSS-REFERENCE TO RELATED APPLICATIONS

The present invention claims priority under 35 USC §119 based on Japanese patent application No. 2007-19753 filed 30 Jan. 2007. The subject matter of this priority document is incorporated by reference herein.

BACKGROUND OF THE INVENTION

Field of the Invention

The present invention relates to a brake system comprising an electric braking force generator that brakes a wheel by using a driving force of an electric motor.

Description of the Related Art

Japanese Patent Application Laid-open No. 2005-343366 discloses a brake system of the type referred to as a brake by wire (BBW) brake system, which converts a braking operation of a driver into an electrical signal used to operate a motor cylinder or slave cylinder as an electric braking force generator, and operates a wheel cylinder by brake fluid pressure generated by the motor cylinder.

In an emergency situation such as collision avoidance, the rotational speed of the electric motor of the slave cylinder is required to be increased so as to quickly build-up the brake fluid pressure. However, if the rated rotational speed of the electric motor is set at a high value in order to enhance the response of braking force generation in an emergency situation, the rated torque decreases correspondingly, leading to a possibility that the torque of the electric motor becomes insufficient under normal operating conditions. If both the rated rotational speed and the rated torque of the electric motor are set at high values against this possibility, a problem occurs in that the size and/or price of the electric motor are increased.

SUMMARY OF THE INVENTION

The present invention has been made in view of the above-described circumstances, and it is an object of the present invention to enhance the response of braking force generation without increasing the size of an electric motor that drives an electric braking force generator.

To achieve the above object, according to a first aspect of the present invention, there is provided a brake system comprising: an electric braking force generator that brakes a wheel using a driving force of an electric motor; and an electric motor controller that performs a field-weakening control of the electric motor.

With the first aspect of the present invention, the electric motor controller performs the field-weakening control of the electric motor which operates the electric braking force generator. Therefore, while the electric motor generates a torque which is sufficient under normal operating conditions, the rotational speed of the electric motor is increased when the field-weakening control is performed by the electric motor controller, thereby quickly activating the electric braking force generator to enhance response of braking force generation.

According to a second aspect of the present invention, in addition to the first aspect, the electric motor controller sets a target braking force in accordance with at least an operational amount of braking by a driver, and performs the field-weakening control in accordance with a rate of change in the target braking force.

With the second aspect of the present invention, the electric motor controller sets the target braking force in accordance with the operational amount of braking by the driver, and performs the field-weakening control in accordance with the rate of change in the target braking force. Therefore, in an emergency where a quick build-up of the brake fluid pressure is needed, it is possible to increase the rotational speed of the electric motor to quickly activate the electric braking force generator.

According to a third aspect of the present invention, in addition to the first aspect, the electric motor controller detects load characteristics of the electric braking force generator, and performs the field-weakening control in accordance with the load characteristics.

With the third aspect of the present invention, the electric motor controller detects the load characteristics of the electric braking force generator, and performs the field-weakening control in accordance with the load characteristics. Therefore, the increase in the rotational speed of the electric motor can compensate for a delay in the response of braking force generation due to a difference in the load characteristics of the electric braking force generator.

According to a fourth aspect of the present invention, in addition to the third aspect, the electric motor controller detects the load characteristics when an ignition switch is turned on.

With the fourth aspect of the present invention, the electric motor controller detects the load characteristics of the electric braking force generator when the ignition switch is turned on. Therefore, it is possible to perform an appropriate field-weakening control by detecting the latest load characteristics each time the engine is started.

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

There have been chosen specific embodiments of a brake system according to the invention and specific alternative structures and modifications thereto, the embodiments chosen for the purposes of illustration and description of the structure and method of the invention are shown in the accompanying drawings forming a part of the specification.

BRIEF DESCRIPTION OF THE DRAWINGS

FIGS. 1 to 6 show a first embodiment of the present invention wherein

FIGS. 7A to 10 show a second embodiment of the present invention wherein

DESCRIPTION OF THE PREFERRED EMBODIMENTS

Figure 1:
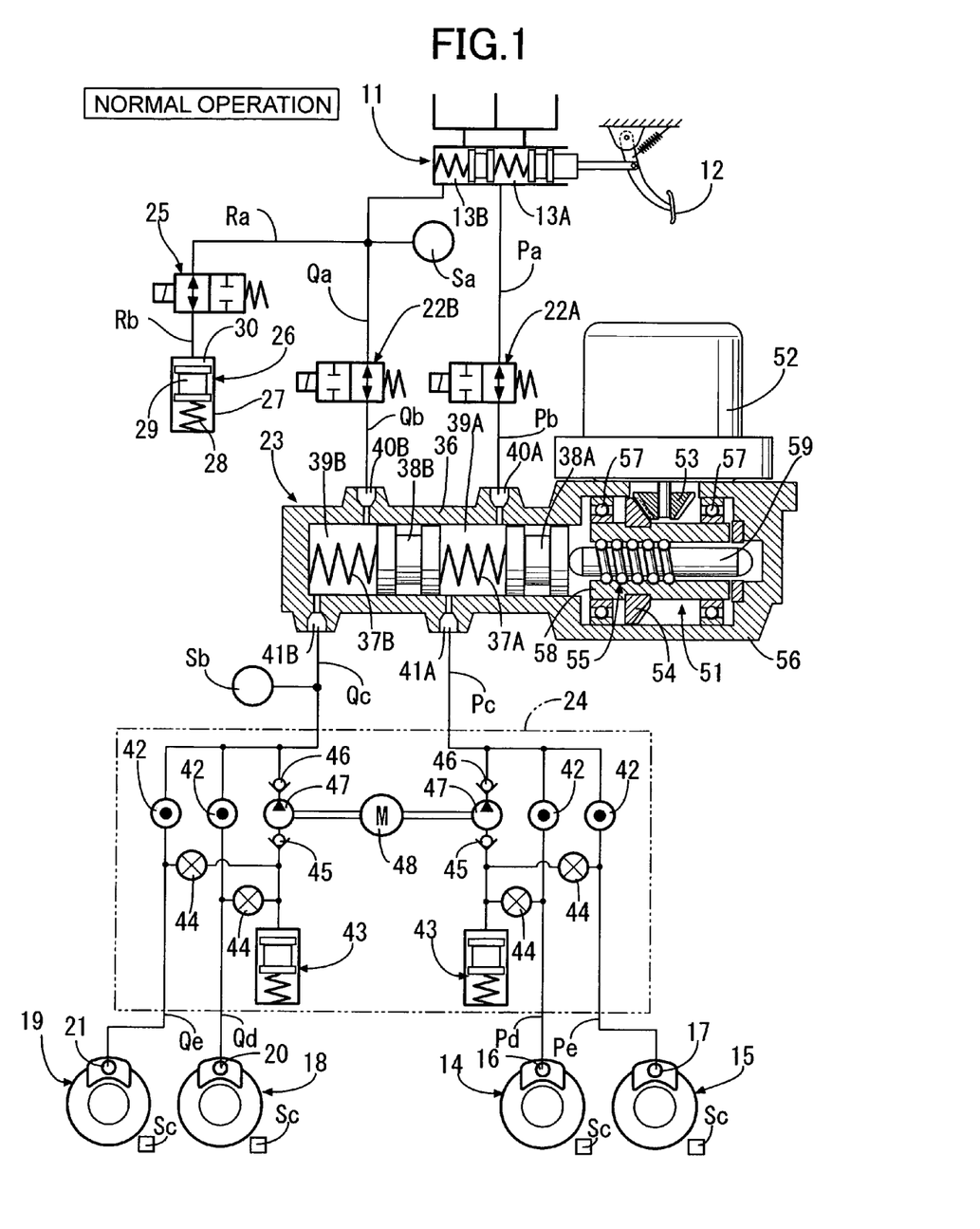
FIG. 1 is a fluid-pressure circuit diagram of a vehicle brake system according to a first embodiment when the vehicle is operating under normal conditions.

As shown in FIG. 1, a tandem master cylinder 11 has two fluid pressure chambers 13A and 13B which output brake fluid pressure according to a pushing force applied to a brake pedal 12 by a driver treading on the brake pedal 12. One of the fluid pressure chambers 13A is connected to wheel cylinders 16 and 17 of disc brake devices 14 and 15 for braking, for example, a left front wheel and a right rear wheel through fluid passages Pa, Pb, Pc, Pd, and Pe. The other fluid pressure chamber 13B is connected to wheel cylinders 20 and 21 of disc brake devices 18 and 19 for braking, for example, a right front wheel and a left rear wheel through fluid passages Qa, Qb, Qc, Qd, and Qe.

A shutoff valve 22A, which is a normally open solenoid valve, is provided between the fluid passages Pa and Pb. A shutoff valve 22B, which is a normally open solenoid valve, is provided between the fluid passages Qa and Qb. A slave cylinder 23 is provided between the fluid passages Pb, Qb and the fluid passages Pc, Qc. An anti-lock brake system (ABS) 24 is provided between the fluid passages Pc, Qc and the fluid passages Pd, Pe; Qd, Qe.

A reaction force permission valve 25, which is a normally closed solenoid valve, is connected between a fluid passage Ra branching from the fluid passage Qa and a fluid passage. Rb. A stroke simulator 26 is connected to the fluid passage Rb. The stroke simulator 26 has a cylinder 27 and a piston 29 slidably fitted in the cylinder 27 while being urged by a spring 28. A fluid chamber 30, formed on the side of the piston 29 opposite from the spring 28, communicates with the fluid passage Rb.

An actuator 51 of the slave cylinder 23 has an electric motor 52, which may comprise a permanent magnet synchronous motor, such as a brushless DC motor or an AC servo motor, a drive bevel gear 53 provided on the rotating shaft of an electric motor 52, a follower bevel gear 54 meshing with the drive bevel gear 53, and a ball screw mechanism 55 operated by the follower bevel gear 54. A sleeve 58 is rotatably supported in an actuator housing 56 via a pair of ball bearings 57. An output shaft 59 is coaxially arranged on an inner periphery of the sleeve 58. The follower bevel gear 54 is arranged on an outer periphery of the sleeve 58.

A pair of pistons 38A and 38B, urged in a retreat direction by a pair of return springs 37A and 37B, are slidably disposed in a cylinder body 36 of the slave cylinder 23. A pair of fluid pressure chambers 39A and 39B are defined on the front faces of the pistons 38A and 38B, respectively, as portions of a hollow bore formed in the cylinder body 36 of the slave cylinder 23. A front end of the output shaft 59 abuts on a rear end of the rear piston 38A. One of the fluid pressure chamber 39A communicates with the fluid passages Pb, Pc via ports 40A, 41A, while the other fluid pressure chamber 39B communicates with the fluid passages Qb, Qc through ports 40B, 41B.

The structure of the ABS 24 is of a well-known type. The ABS 24 has two streams structurally identical to each other: a stream including the disc brake devices 14 and 15 for braking the left front wheel and the right rear wheel; and a stream for the disc brake devices 18 and 19 for braking the right front wheel and the left rear wheel. Of these streams, the stream for the disc brake devices 14 and 15 will be described as a representative. It will be understood that the stream for disk brake devices 18 and 19 works in an identical fashion. A pair of in-valves 42 comprising normally open solenoid valves are provided between the fluid passage Pc and the fluid passages Pd, Pe. A pair of out-valves 44 comprising normally closed solenoid valves are provided between the fluid passages Pd, Pe on the downstream side of the in-valves 42 and a reservoir 43. A fluid pressure pump 47 interposed between a pair of check valves 45 and 46 is provided between the reservoir 43 and the fluid passage Pc. The fluid pressure pump 47 is driven by an electric motor 48.

Figure 3:
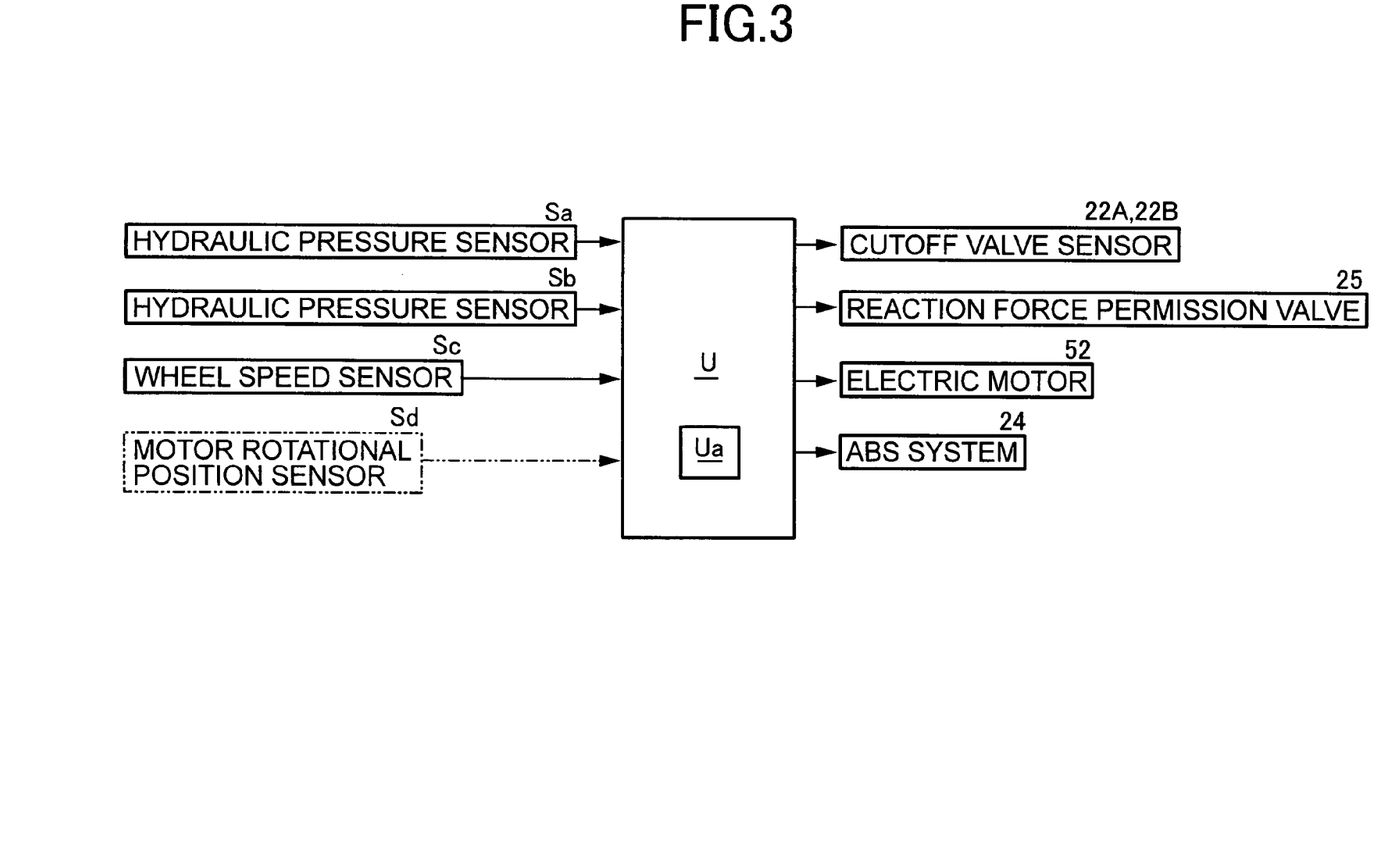
FIG. 3 is a block diagram of a control system of the vehicle brake system according to the first embodiment.

As shown in FIG. 3, connected to an electronic control unit U, are a fluid pressure sensor Sa for detecting the brake fluid pressure generated by the master cylinder 11, a fluid pressure sensor Sb for detecting the brake fluid pressure transmitted to the disc brake devices 18 and 19, a vehicle wheel speed sensors Sc for detecting the vehicle wheel speeds of the vehicle wheels, and a motor rotational position sensor (resolver) Se for detecting the rotational position of the electric motor 52. The electronic control unit U is used for controlling the operation of the shutoff valves 22A and 22B, the reaction force permission valve 25, the electric motor 52 of the slave cylinder 23 and the ABS 24.

Figure 4:
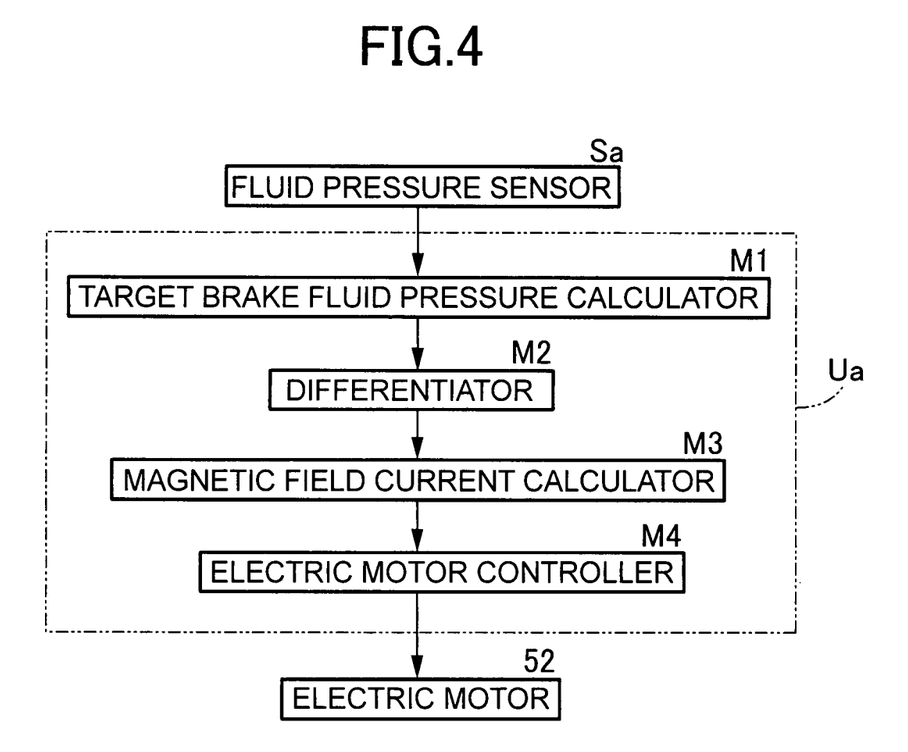
FIG. 4 is a block diagram of a field-weakening control section of an electronic control unit according to the first embodiment.

As shown in FIG. 4, a field-weakening control section Ua of the electronic control unit U comprises a target brake fluid pressure calculator M1, a differentiator M2, a field current calculator M3, and an electric motor controller M4. The fluid pressure sensor Sa for detecting the brake fluid pressure generated by the master cylinder 11 is connected to the target brake fluid pressure calculator M1. The electric motor 52 of the slave cylinder 23 is connected to the electric motor controller M4.

The operation of an exemplary embodiment of the present invention having the above-described arrangement will now be described.

In a situation where the system operates normally, the shutoff valves 22A and 22B, comprising normally open solenoid valves, are demagnetized so as to be in an open state, and the reaction force permission valve 25, comprising a normally closed solenoid valve, is magnetized so as to be in an open state. In this state, when the fluid pressure sensor Sa provided in the fluid passage Qa detects a pushing force on the brake pedal 12 by the driver, the actuator 51 of the slave cylinder 23 is activated. That is, when the electric motor 52 is driven in one direction, the output shaft 59 is advanced by the drive bevel gear 53, the follower bevel gear 54 and the ball screw mechanism 55, so that the pair of the pistons 38A and 38B urged by the output shaft 59 are advanced. Because the ports 40A and 40B leading to the fluid passages Pb and Qb are closed quickly after the pistons 38A and 38B begin to advance, a brake fluid pressure is generated in the fluid pressure chambers 39A and 39B. This brake fluid pressure is transmitted to the wheel cylinders 16, 17, 20, and 21 of the disc brake devices 14, 15, 18, and 19 through the opened in-valves 42 of the ABS 24, thereby braking the vehicle wheels.

Because the ports 40A and 40B leading to the fluid passages Pb and Qb are closed by the pistons 38A and 38B, the brake fluid pressure generated by the master cylinder 11 is not transmitted to the disc brake devices 14, 15, 18, and 19. At this time, the brake fluid pressure generated in the other fluid pressure chamber 13B of the master cylinder 11 is transmitted to the fluid chamber 30 of the stroke simulator 26 through the opened reaction force permission valve 25 to move the piston 29 against the spring 28, thereby generating a pseudo pedal reaction force while permitting the stroke of the brake pedal 12 to eliminate an uncomfortable feeling to the driver.

The operation of the actuator 51 for the slave cylinder 23 is controlled so that the brake fluid pressure generated by the slave cylinder 23 and detected by the fluid pressure sensor Sb provided in the fluid passage Qc has a value corresponding to the brake fluid pressure generated by the master cylinder 11 and detected by the fluid pressure sensor Sa provided in the fluid passage Qa, thereby generating the braking force in the disc brake devices 14, 15, 18, and 19 according to the pushing force applied to the brake pedal 12 by the driver.

If the slip ratio of any vehicle wheel is increased and a tendency of locking is detected based on the output from the wheel speed sensors Sc corresponding to the vehicle wheels during the above-described braking, the ABS 24 is operated in a state in which the slave cylinder 23 is maintained in the operating state, thereby preventing locking of the vehicle wheels.

That is, when any vehicle wheel has a tendency of locking, a pressure reducing operation is performed to release the brake fluid pressure in the wheel cylinder by opening the out-valve 44 in a state where the transmission of the brake fluid pressure from the slave cylinder 23 is shut off by closing the in-valve 42 communicating with the wheel cylinder; and a pressure maintaining operation is subsequently performed to maintain the brake fluid pressure in the wheel cylinder by closing the out-valve 44, thereby reducing the braking force to avoid locking of the vehicle wheel.

When the vehicle wheel speed is recovered, thereby reducing the slip ratio, a pressure increasing operation is performed to increase the brake fluid pressure in the wheel cylinder by opening the in-valve 42, thereby increasing the braking force for braking the vehicle wheel. Each time the vehicle wheel has a tendency of locking due to this pressure increasing operation, the above-described pressure reducing, maintaining and increasing operation is performed again. The operation is repeatedly performed to generate the maximum braking force while preventing locking of the vehicle wheels. The brake fluid flowing into the reservoir 43 during this process is returned by the fluid pressure pump 47 to the fluid passages Pc and Qc on the upstream side.

During the above-described ABS control, the shutoff valves 22A and 22B are magnetized to be closed, thereby preventing a fluid pressure fluctuation associated with the operation of the ABS 24 from being transmitted as a kickback from the master cylinder 11 to the brake pedal 12.

If the slave cylinder 23 becomes inoperable due to power failure or the like, the braking control is performed by the brake fluid pressure generated by the mater cylinder 11 in place of the brake fluid pressure generated by the slave cylinder 23.

Figure 2:
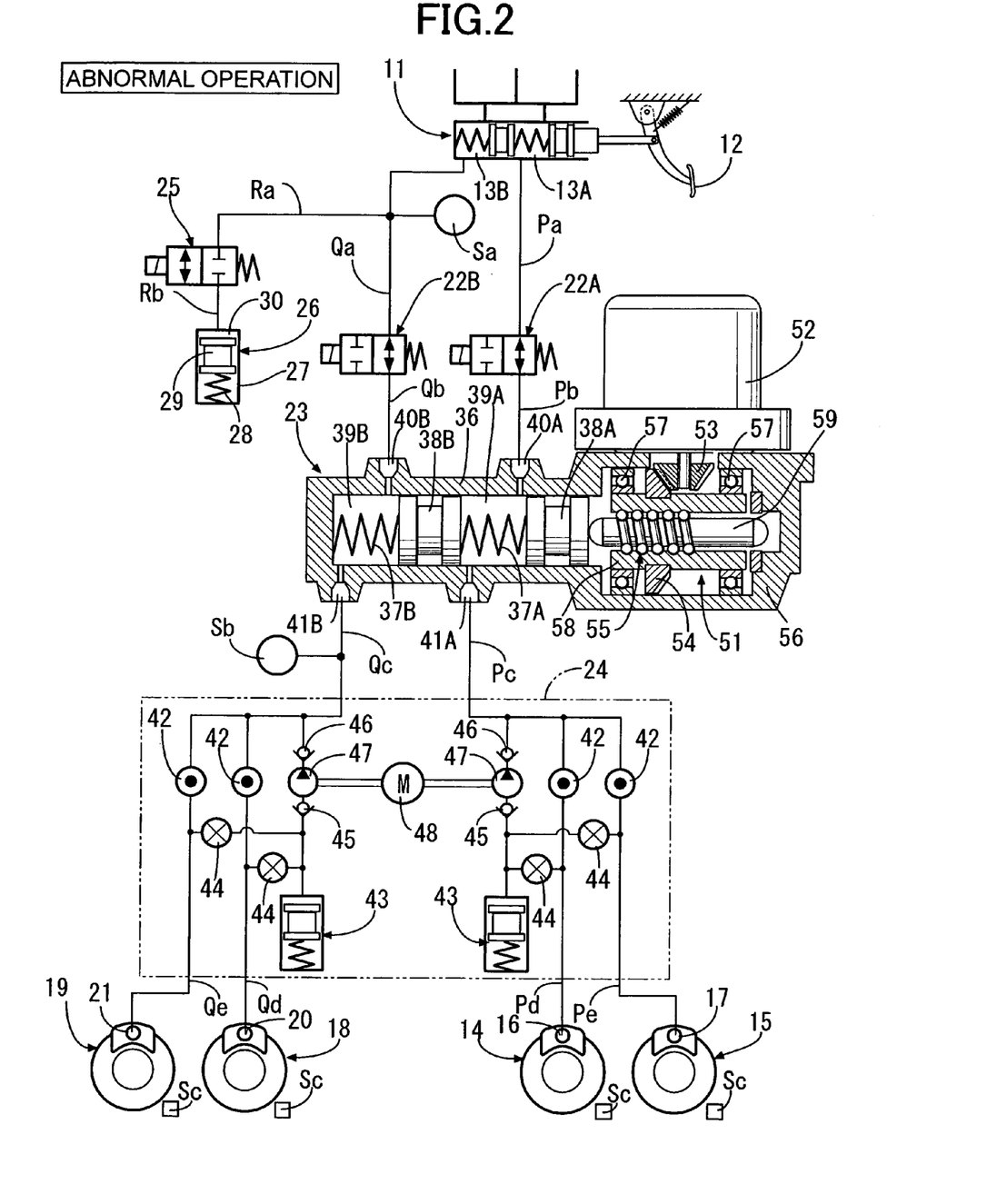
FIG. 2 is a fluid-pressure circuit diagram of a vehicle corresponding to FIG. 1 when the brake system is operating under abnormal conditions.

That is, in the event of power failure or the like, as shown in FIG. 2, the shutoff valves 22A and 22B, comprising normally open solenoid valves, remain open; the reaction force permission valve 25 comprising a normally closed solenoid valve is automatically closed; the in-valves 42, comprising normally open solenoid valves, are automatically opened; and the out-valves 44, comprising normally closed solenoid valves, are automatically closed. In this state, the brake fluid pressure generated in the fluid pressure chambers 13A and 13B of the master cylinder 11 passes the shutoff valves 22A and 22B, the fluid pressure chambers 39A and 39B of the slave cylinder 23 and the in-valves 42, without being absorbed by the stroke simulator 26; and operates the wheel cylinders 16, 17, 20, and 21 of the disc brake devices 14, 15, 18, and 19, respectively, for braking the vehicle wheels, thus generating the braking force without any problem.

In such a case where the driver has suddenly applied a pushing force to the brake pedal 12 in order to avoid a collision, for example, it is required that the brake fluid pressure be increased by activating the slave cylinder 23 as soon as possible. However, there is a trade-off between the rated rotational speed and rated torque of the electric motor 52. Therefore, if the rated rotational speed of the electric motor 52 is set at a high value in order to enhance the response of braking force generation in an emergency, the rated torque decreases correspondingly, leading to a possibility that the torque of the electric motor 52 becomes insufficient under normal operating conditions. If both the rated rotational speed and the rated torque of the electric motor 52 are set at high values to prevent this possibility, this is disadvantageous because the size and/or price of the electric motor 52 will be increased. Thus, in the embodiments of the present invention, the field-weakening control of the electric motor 52 is performed to increase the rotational speed in an emergency situation where the response of braking force generation is required to be enhanced.

That is, in the field-weakening control section Ua of the electronic control unit U shown in FIG. 4, the target brake fluid pressure calculator M1 to which the brake fluid pressure of the master cylinder 11, detected by the fluid pressure sensor Sa is inputted, calculates a target brake fluid pressure Pref corresponding to the brake fluid pressure of the master cylinder 11, i.e., the brake fluid pressure to be generated in the slave cylinder 23. The differentiator M2 calculates a rate of change dPref/dt of the target brake fluid pressure by time-differentiating the target brake pressure Pref. A situation where the rate of change dPref/dt of the target brake fluid pressure is high is, for example, the case where the driver has suddenly applied a pushing force to the brake pedal 12, corresponding to an emergency where a quick building-up of a braking force is required. Such a high rate of change of the target brake fluid pressure can be readily determined, for example, when the rate of change exceeds a predetermined value.

The electric motor 52, which may comprise a permanent magnet synchronous motor, such as a brushless DC motor or an AC servo motor, is controlled on the basis of an excitation current command value Iq* of a q-axis component and an excitation current command value Id* of a d-axis component. The excitation current command value Iq* of a q-axis component is outputted in proportion to a torque command value to be generated in the electric motor 52. The excitation current command value Id* of a d-axis component is basically 0 when the field-weakening control of the electric motor 52 is not performed. When the excitation current command value Id* of a d-axis component is increased in the negative direction, the amount of field-weakening increases and the rotational speed of the electric motor 52 increases.

Figure 5:
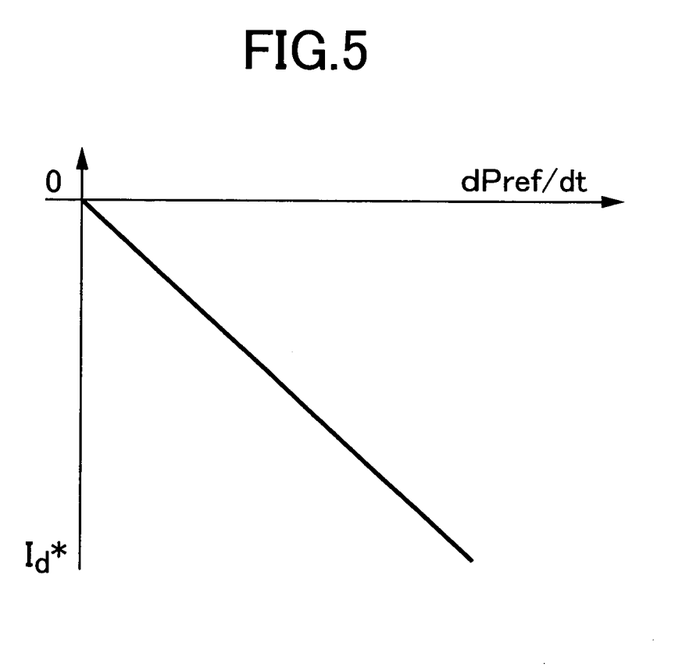
FIG. 5 is a graph showing a map used for determining a magnetic field current command value based on a rate of change in a target fluid pressure according to the first embodiment.
Figure 6:
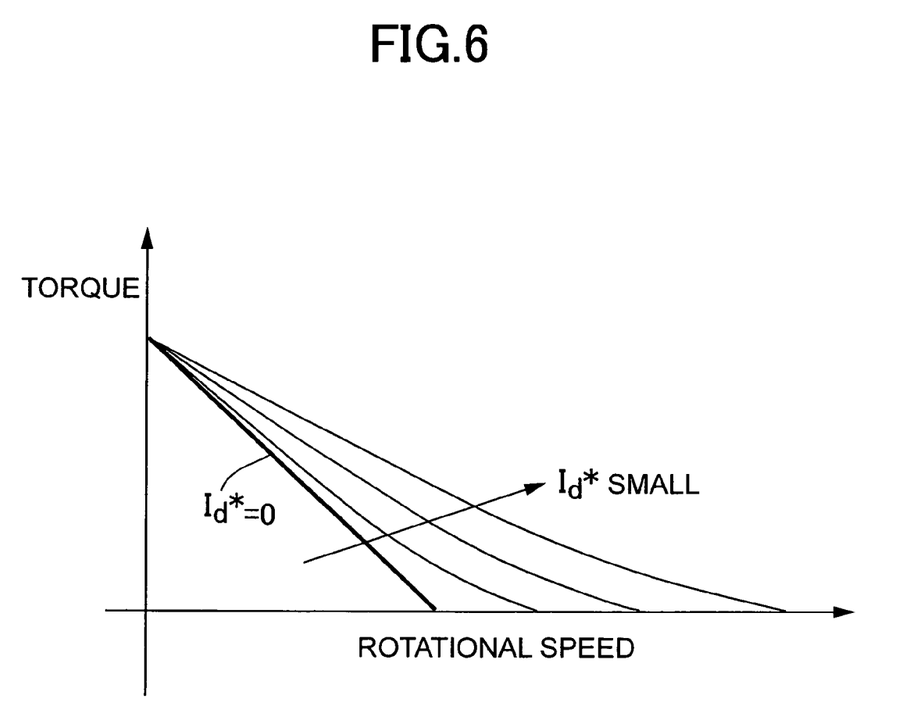
FIG. 6 is a graph showing a relationship between rotational speed and torque when changing a field current command value Iq* of a q-axis component of the electric motor.
Figure 7:
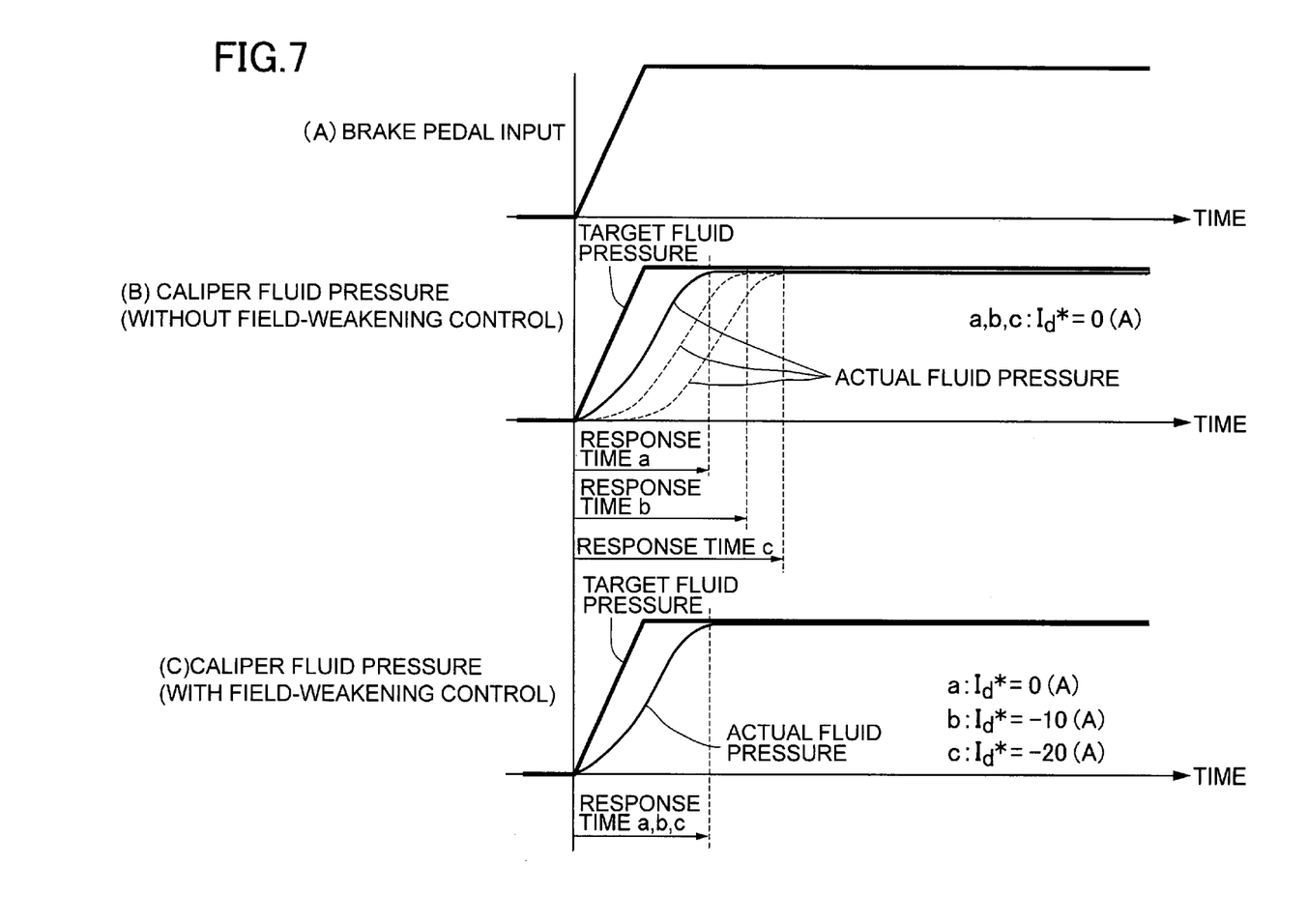
FIGS. 7A to 7C are diagrams or graphs showing a technique of enhancing the response by a field-weakening control according to the second embodiment.

The field current calculator M3 calculates a field current command value Id* by, for example, searching the map shown in FIG. 5 using the rate of change dPref/dt of the target brake fluid pressure as a parameter. The electric motor controller M4 performs the field-weakening control of the electric motor 52 on the basis of the calculated field current command value Id*. At this time, the field current command value Id* increases in the negative direction with an increase in the rate of change dPref/dt of the target brake fluid pressure, and correspondingly the amount of field-weakening increases, thereby increasing the rotational speed of the electric motor 52. Therefore, in an emergency situation where the rate of change dPref/dt of the target brake fluid pressure increases, as shown in FIG. 6, the field current command value Id* is increased in the negative direction, thereby increasing the amount of field-weakening of the electric motor 52 to increase the rotational speed of the electric motor 52, so that the slave cylinder 23 is quickly activated. Thus, it is possible to enhance the response of braking force generation.

As described above, while using the electric motor 52 which does not have a particularly high rated rotational speed, it is possible to enhance the response of braking force generation in an emergency situation requiring an enhanced response by performing the field-weakening control of the electric motor 52 to increase the rotational speed thereof.

FIGS. 7A to 10 show a second embodiment of the present invention.

In the first embodiment, the field-weakening operation of the electric motor 52 is performed in accordance with the target brake fluid pressure, whereas in the second embodiment, the field-weakening operation of the electric motor 52 is performed in accordance with the load characteristics of the slave cylinder 23 represented by caliper rigidity of the wheel cylinders 16, 17, 20, 21.

The calipers of the wheel cylinders 16, 17, 20, 21 generate a braking force by pressing the brake pad against the brake disc with the brake fluid pressure. In the case where the rigidity of the caliper main body supporting the brake pad decreases due to secular change or the brake pad itself wears, even if the brake fluid pressure is applied on the caliper, the contact face pressure between the brake pad and the brake disc does not quickly increase, leading to a problem of a lowered response of braking force generation.

When the driver applies a pushing force to the brake pedal 12 as shown in FIG. 7A, there is built-up a target brake fluid pressure to be generated by the slave cylinder 23 corresponding to the pushing force applied to the brake 12, i.e., a target brake fluid pressure to be supplied to the caliper as shown in FIGS. 7B and 7C. However, even if the slave cylinder 23 generates a brake fluid pressure exactly equal to the target brake fluid pressure, an actual fluid pressure of the caliper is built-up with a delay in response time a, b, c which varies depending on the degree of rigidity of the caliper main body and the degree of wear of the brake pad, as shown in FIG. 7B.

As shown in FIG. 7C, in the second embodiment, the field-weakening control of the electric motor 52 is performed such that the field current command value Id* is increased with an increase of response time a, b, c to increase the rotational speed thereof, thereby minimizing the delay in the response time by making the delay in the response time constant.

The operation of the field-weakening control according to the second embodiment will be described with reference to the flowchart of FIG. 8.

First, when an ignition switch is turned on at Step S1, the electric motor 52 is automatically operated at Step S2, even if the driver does not apply a pushing force to the brake pedal 12, to generate a brake fluid pressure in the slave cylinder 23, and the load characteristics of the slave cylinder 23 at the time of operation of the electric motor 52 are detected at Step S3.

The load characteristics of the slave cylinder 23 are characteristics of change in the caliper fluid pressure with respect to the rotational position of the electric motor 52, i.e., the advance positions of the pistons 38A, 38B. The rotational position of the electric motor 52 is detected by the motor rotational position sensor (resolver) Sd (see FIG. 3). The caliper fluid pressure is detected by the fluid pressure sensor Sb (see FIGS. 1 and 2) that is provided in the fluid path Qc.

Figure 9:
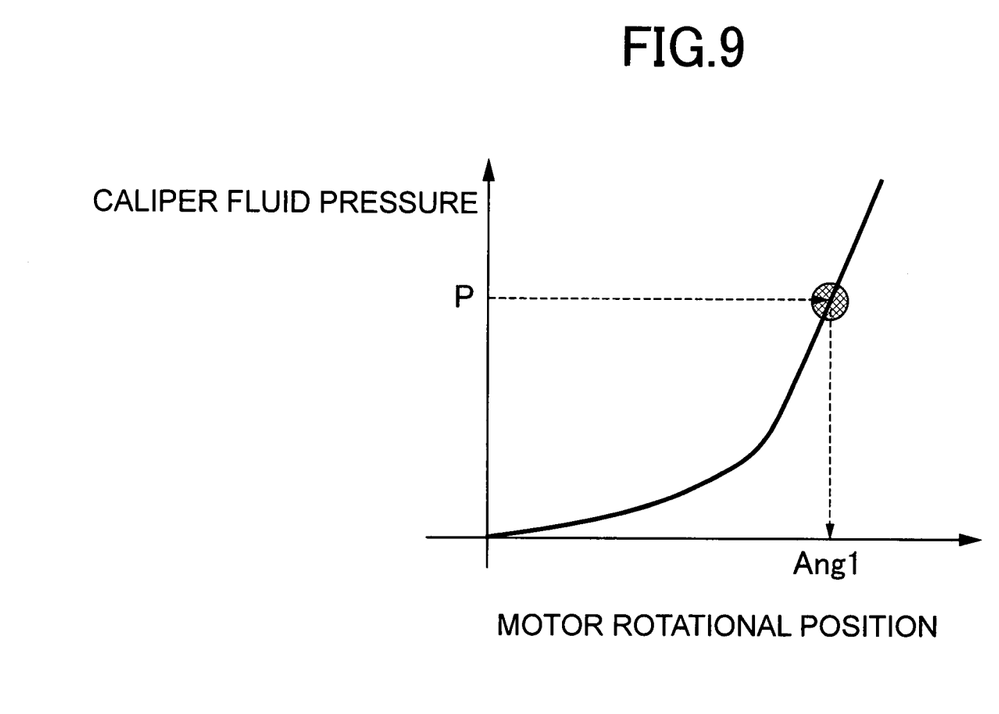
FIG. 9 is a graph showing a technique of detecting load characteristics of a slave cylinder according to the second embodiment.

FIG. 9 is an exemplary graph showing a technique of detecting load characteristics based on detected caliper fluid pressure and detected motor rotational position. The electric motor 52 is driven, the caliper fluid pressure in each rotational position is detected, and a rotational position Ang1 of the electric motor 52, which is obtained when a predetermined caliper fluid pressure P is obtained, is stored. Because the load characteristics change depending on the degree of rigidity of the caliper main body and the degree of wear of the brake pad, the rotational position Ang1 of the electric motor 52 corresponding to the predetermined caliper fluid pressure P changes corresponding to secular change of the slave cylinder 23.

Figure 8:
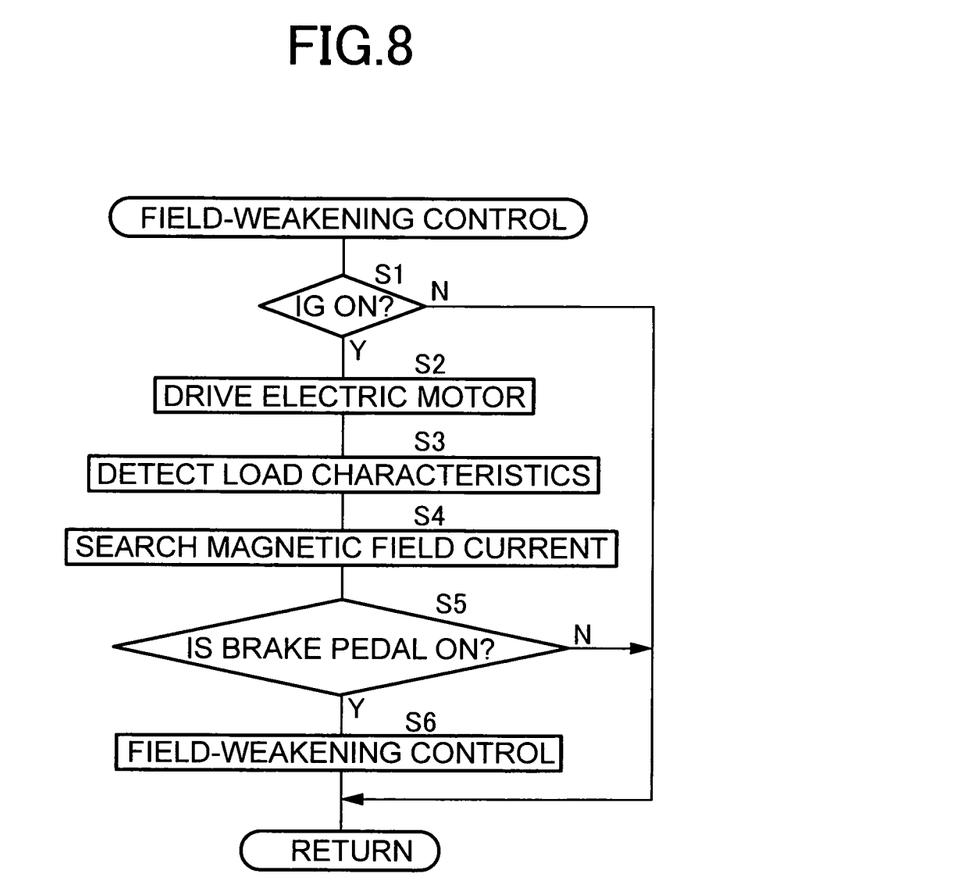
FIG. 8 is a flowchart showing the field-weakening control according to the second embodiment.
Figure 10:
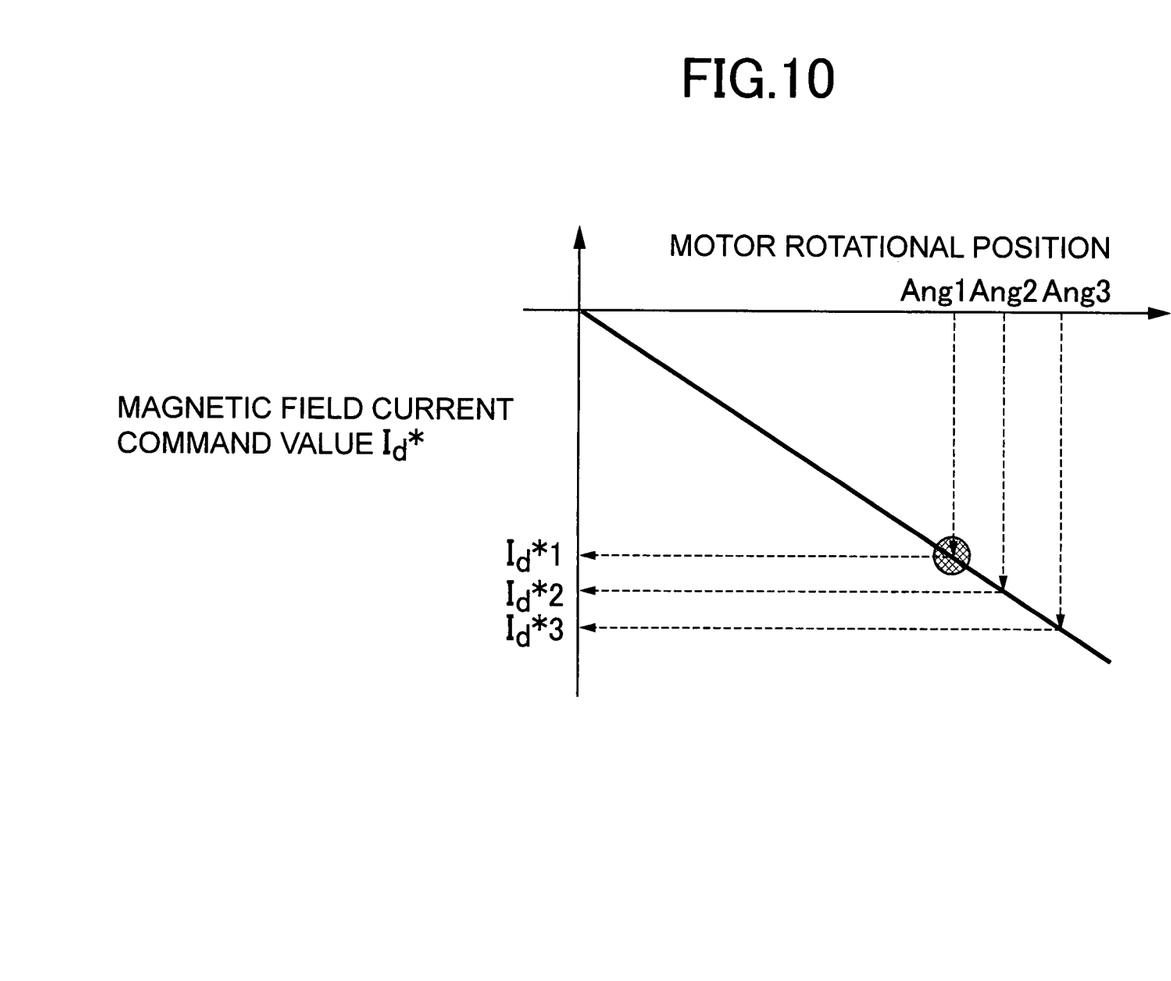
FIG. 10 is a graph showing a map used for determining a magnetic field current command value based on a motor rotational position according to the second embodiment.

Referring again to the flowchart of FIG. 8, at Step S4, the appropriate field current command value Id* for the field-weakening control of the electric motor 52 is searched for in the map of FIG. 10. As shown in FIG. 10, the field current command value Id* increases in the negative direction with increase in the rotational position Ang1, Ang2, Ang3 of the electric motor 52, i.e., with progress in the advance position of the pistons 38A, 38B, and correspondingly the amount of field-weakening increases to increase the rotational speed of the electric motor 52. Therefore, if a pushing force is applied to the brake pedal 12 at Step S5 to activate the slave cylinder 23 and the field-weakening control of the electric motor 52 is performed at Step S6, the amount of field-weakening of the electric motor 52 is increased in proportion to the decrease in the caliper rigidity and in proportion to the increase of the wear of the brake pad to thereby increase the rotational speed of the electric motor 52. Therefore, the slave cylinder 23 is quickly activated to compensate for the deterioration of the response of braking force generation.

Because the detection of the load characteristics of the slave cylinder 23 is performed when the ignition switch is turned on, it is possible to perform an appropriate field-weakening control by detecting the latest load characteristics each time the engine is started.

Exemplary embodiments of the present invention have been described above, but various changes in design may be made without departing from the subject matter of the present invention.

As one example, in the first and second embodiments described above the field weakening control is performed based on either a rate of change of a target braking force set in accordance with an operational amount of braking operation by a driver or on detected load characteristics of the electric braking force generator. However, it is certainly possible to perform the filed weakening control based on both the detected load characteristics of the electric braking force generator and the rate of change of the target braking force.

As a second example, the electric braking force generator of the present invention is not limited to the slave cylinder 23 of the embodiments. The electric braking force generator may be of a mechanical type (non-fluid-pressure type) that generates a braking force by directly driving a brake pad through the electric motor 52.

As another example, in the second embodiment, the load characteristics of the slave cylinder 23 are detected as the relationship of the caliper fluid pressure to the rotational position of the electric motor 52. However, because the rotational position of the electric motor 52 and the advance positions of the pistons 38A, 38B are in a certain corresponding relationship, the load characteristics of the slave cylinder 23 may be detected as the relationship of the caliper fluid pressure to the advance position of the pistons 38A, 38B. The advance positions of the pistons 38A, 38B can be detected by an appropriate position sensor.

What is claimed is:

1. A brake-by-wire brake system comprising:
 a hydraulic master cylinder;
 a first hydraulic pressure sensor in fluid communication with said master cylinder;
 an electric braking force generator including a slave cylinder and an electric motor which drives the slave cylinder to generate a brake fluid pressure which brakes a wheel;
 a second hydraulic pressure sensor in fluid communication with an outlet of the electric braking force generator;
 a normally open cutoff valve disposed between the master cylinder and the electric braking force generator;
 a brake caliper disposed proximate the wheel which receives brake fluid pressure from said slave cylinder, the brake caliper operable to be driven either by operation of the electric braking force generator or by manual operation of the master cylinder, depending on the position of the cutoff valve, wherein the slave cylinder is disposed in series between the master cylinder and the caliper; and
 an electric motor controller that performs a field-weakening control of the electric motor;
 wherein the electric motor generates a torque sufficient to brake a vehicle under normal braking conditions, and the electric motor controller performs the field-weakening control of the motor to increase the rotational speed of the motor under abnormal braking conditions,
 and wherein the electric motor controller sets a target braking force in accordance with at least an operational amount of braking operation by a driver, determines that an abnormal braking condition exists when a rate of change of the target braking force exceeds a predetermined value, and performs the field-weakening control in accordance with the rate of change of the target braking force.

2. A brake-by-wire brake system comprising:
 an electric braking force generator that is capable of generating a fluid pressure for braking a wheel by a driving force of an electric motor; and
 a controller for determining a target brake fluid pressure based on at least an operational amount of braking operation by a driver;
 wherein the electric braking force generator comprises:
 a cylinder body having a fluid pressure chamber formed therein which communicates with a brake caliper;
 a piston slidably disposed in the cylinder body, said piston operable to pressurize fluid in the fluid pressure chamber;
 a spring disposed in the cylinder body that urges the piston in a retreat direction; and
 said electric motor, which is operable to drive the piston;
 wherein the controller is operable to perform a field-weakening control of the electric motor according to load characteristics based on an operation amount of the electric motor and a fluid pressure of the brake caliper;
 and wherein the controller sets a target braking force in accordance with at least an operational amount of braking operation by a driver, determines that an abnormal braking condition exists when a rate of change of the target braking force exceeds a predetermined value, and performs the field-weakening control in accordance with the rate of change of the target braking force.

* * * * *